(12) United States Patent
Habering et al.

(10) Patent No.: US 7,552,962 B2
(45) Date of Patent: Jun. 30, 2009

(54) SLIDING DOOR SYSTEM

(75) Inventors: Richard Habering, Cologne (DE); Andreas Hermey, Hennef (DE); Gunter Blase, Bergisch Gladbach (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 10/599,060

(22) PCT Filed: Mar. 21, 2005

(86) PCT No.: PCT/DE2005/000525

§ 371 (c)(1),
(2), (4) Date: Jul. 2, 2007

(87) PCT Pub. No.: WO2005/090825

PCT Pub. Date: Sep. 29, 2005

(65) Prior Publication Data

US 2007/0278820 A1 Dec. 6, 2007

(30) Foreign Application Priority Data

Mar. 19, 2004 (DE) ........................ 10 2004 013 974

(51) Int. Cl.
*B60J 5/06* (2006.01)
(52) U.S. Cl. ..................................... 296/155
(58) Field of Classification Search ............... 296/155
See application file for complete search history.

(56) References Cited

U.S. PATENT DOCUMENTS 6,174,020 B1 * 1/2001 Knettle et al. ............... 296/155

(Continued)

FOREIGN PATENT DOCUMENTS

EP 1010558 6/2000

(Continued)

OTHER PUBLICATIONS

International Search Report dated Aug. 3, 2005, received in corresponding PCT Application No. PCT/DE05/000525, 3 pgs.

(Continued)

*Primary Examiner*—Dennis H Pedder
(74) *Attorney, Agent, or Firm*—Grossman Tucker Perreault & Pfleger, PLLC

(57) ABSTRACT

A sliding door system for a vehicle with a vehicle body having a door opening and a sliding door (3), comprises a guide rail (1) which can be mounted at or in the vehicle body in the proximity of the door opening, a guide element (2) which is displaceable along the guide rail (1) and which is connected to the sliding door (3) by way of a holding arm (5), a line receiving means (15) of pivotably interconnected members (16) for receiving and guiding electric lines (20) from a connection on the vehicle body to a connection at the sliding door (3), wherein the line receiving means (15) is guided in a guide device. In order to provide such a sliding door system which has a space-saving structure and which is suitable for the subsequent installation of a line receiving means (15) for the energy supply for the sliding door (3) it is proposed that the guide device for the line receiving means (15) is integrated into the guide rail (1) for the guide element (2) of the sliding door (3). (FIG. 1).

14 Claims, 10 Drawing Sheets

Figure 19:
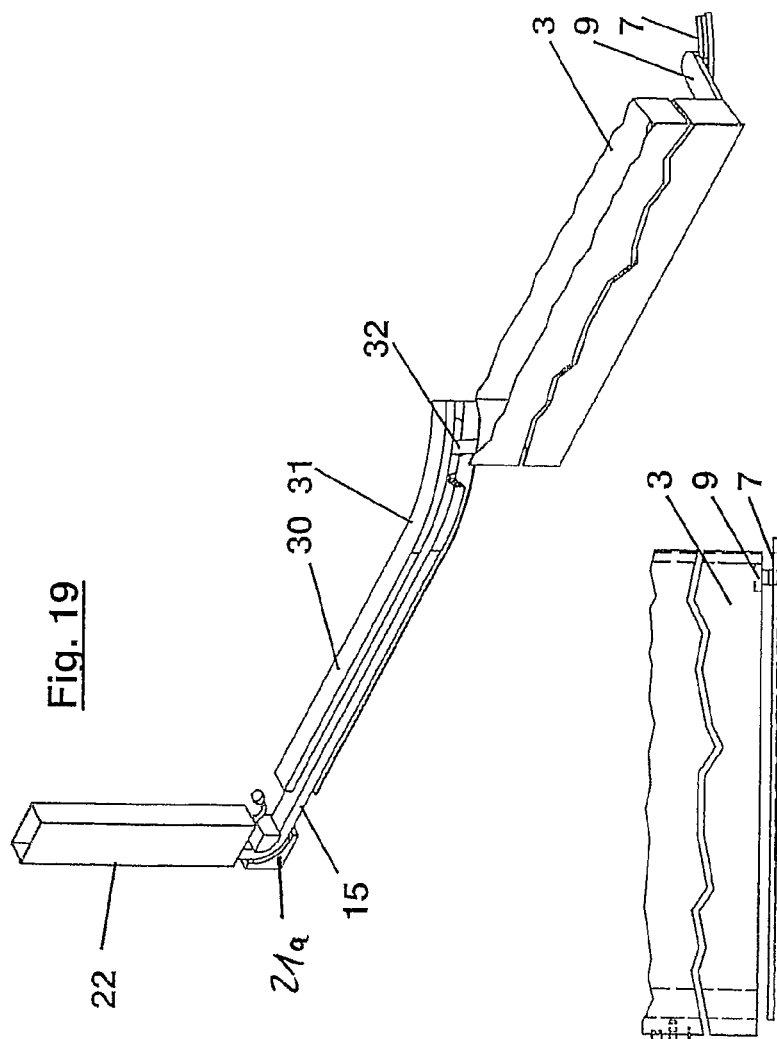

U.S. PATENT DOCUMENTS 6,781,058 B1 * 8/2004 DeCicco et al. ........... 174/72 A
2004/0084932 A1 * 5/2004 Suzuki et al. ............... 296/155

FOREIGN PATENT DOCUMENTS

| JP | 10000936 | 1/1998 |
| JP | 11093514 | 4/1999 |
| JP | 2000-53078 | * 2/2000 |
| JP | 2002225644 | 8/2002 |

OTHER PUBLICATIONS

International Preliminary Report on Patentability received in corresponding PCT Application No. PCT/DE05/000525, 5 pgs.

* cited by examiner

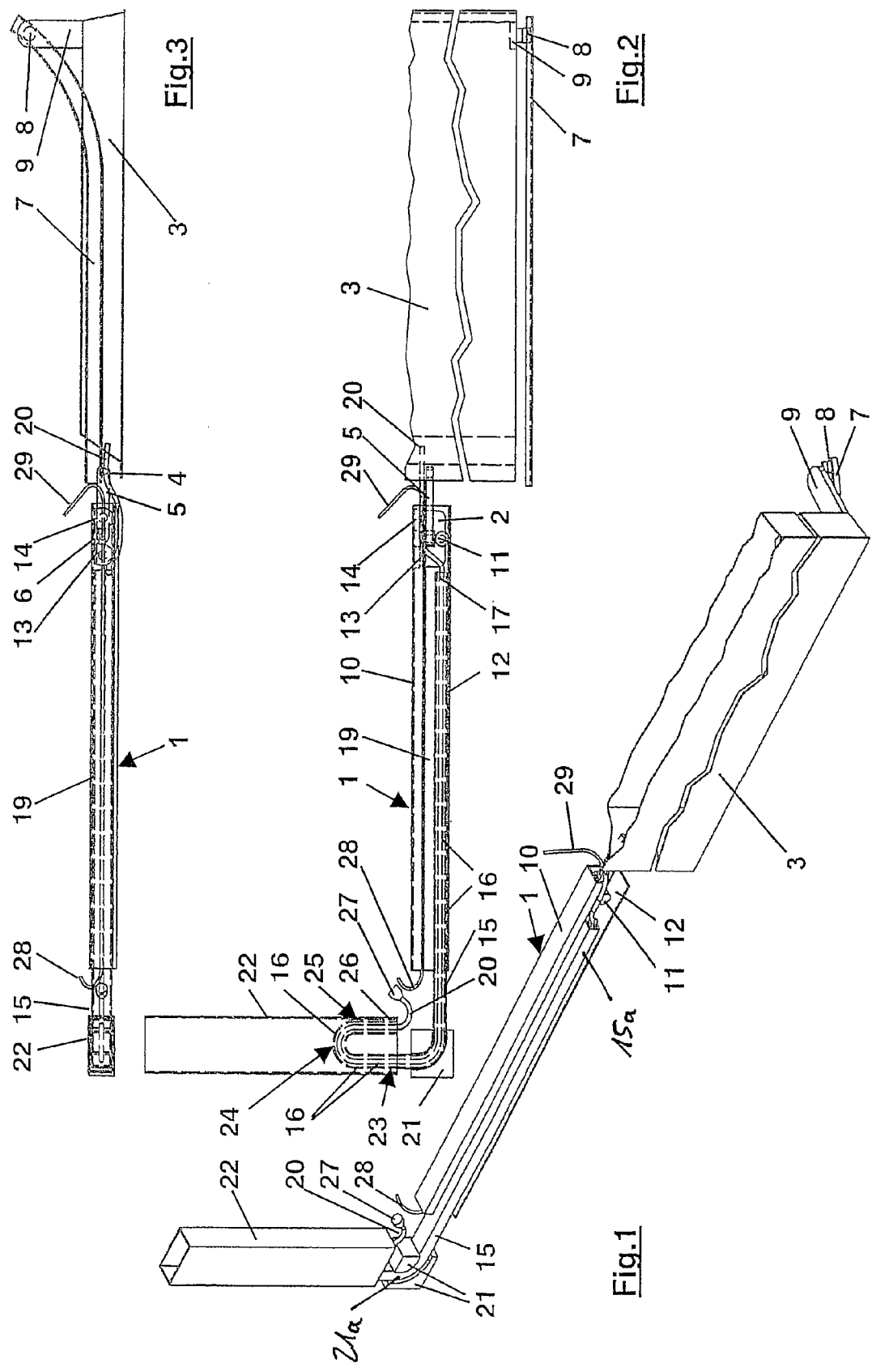

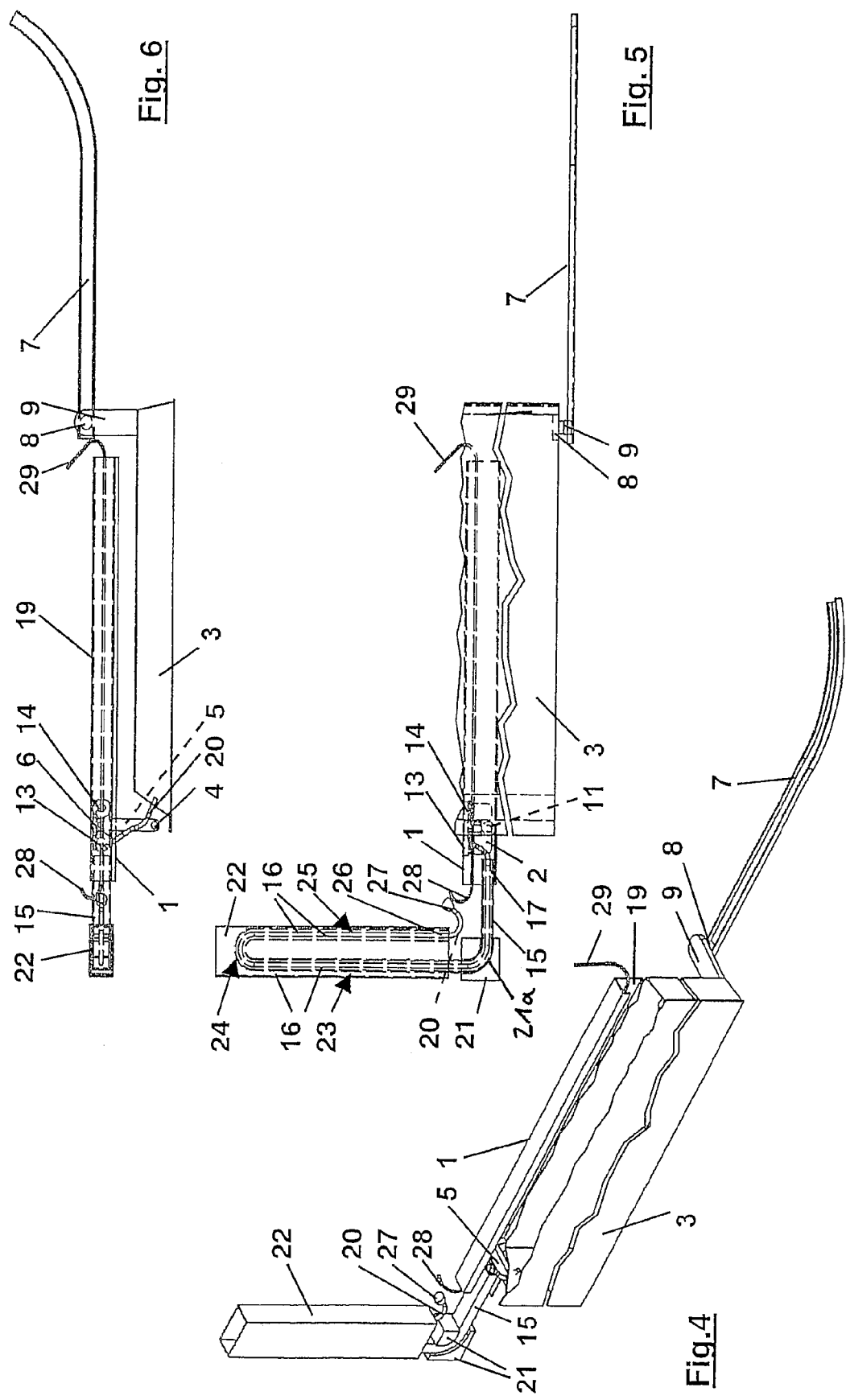

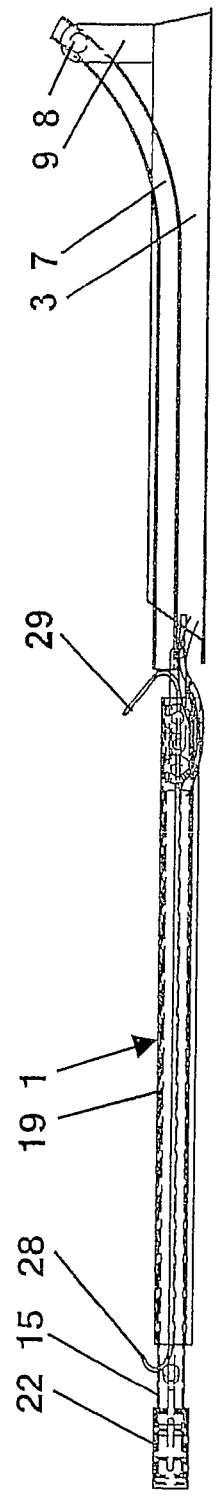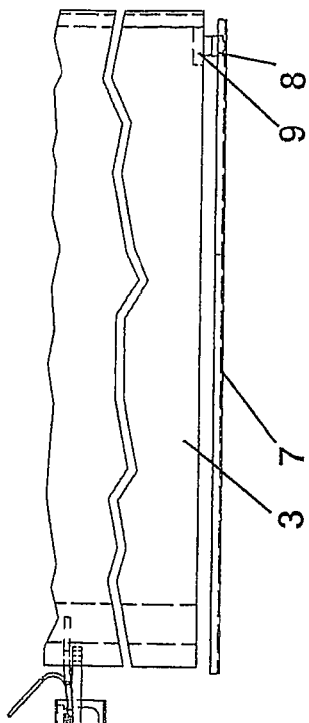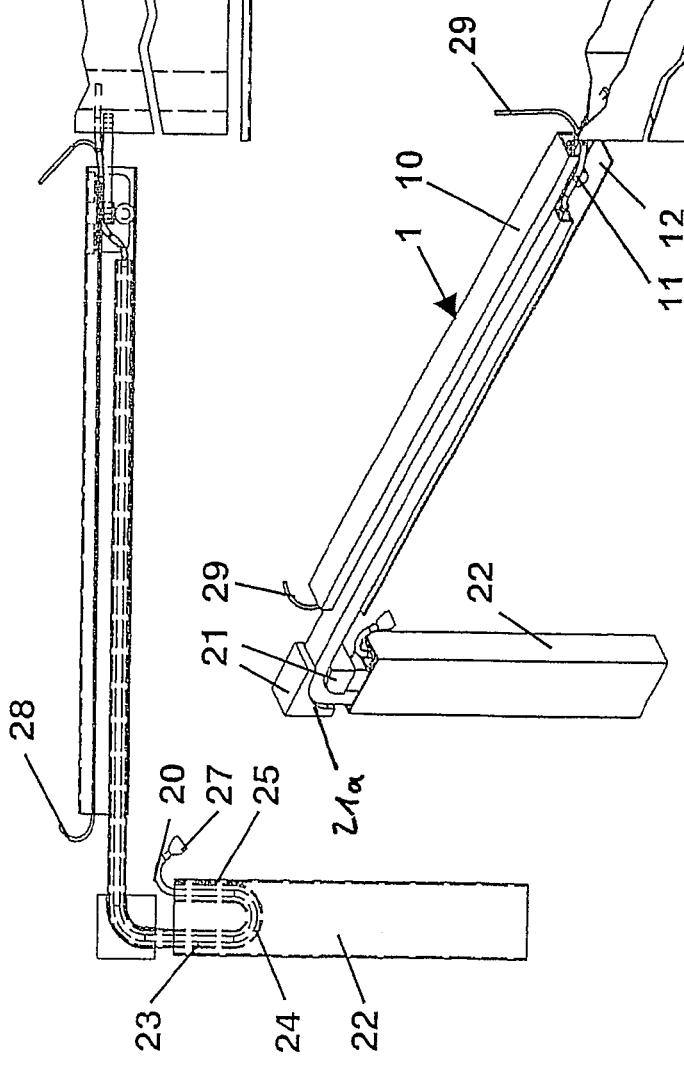

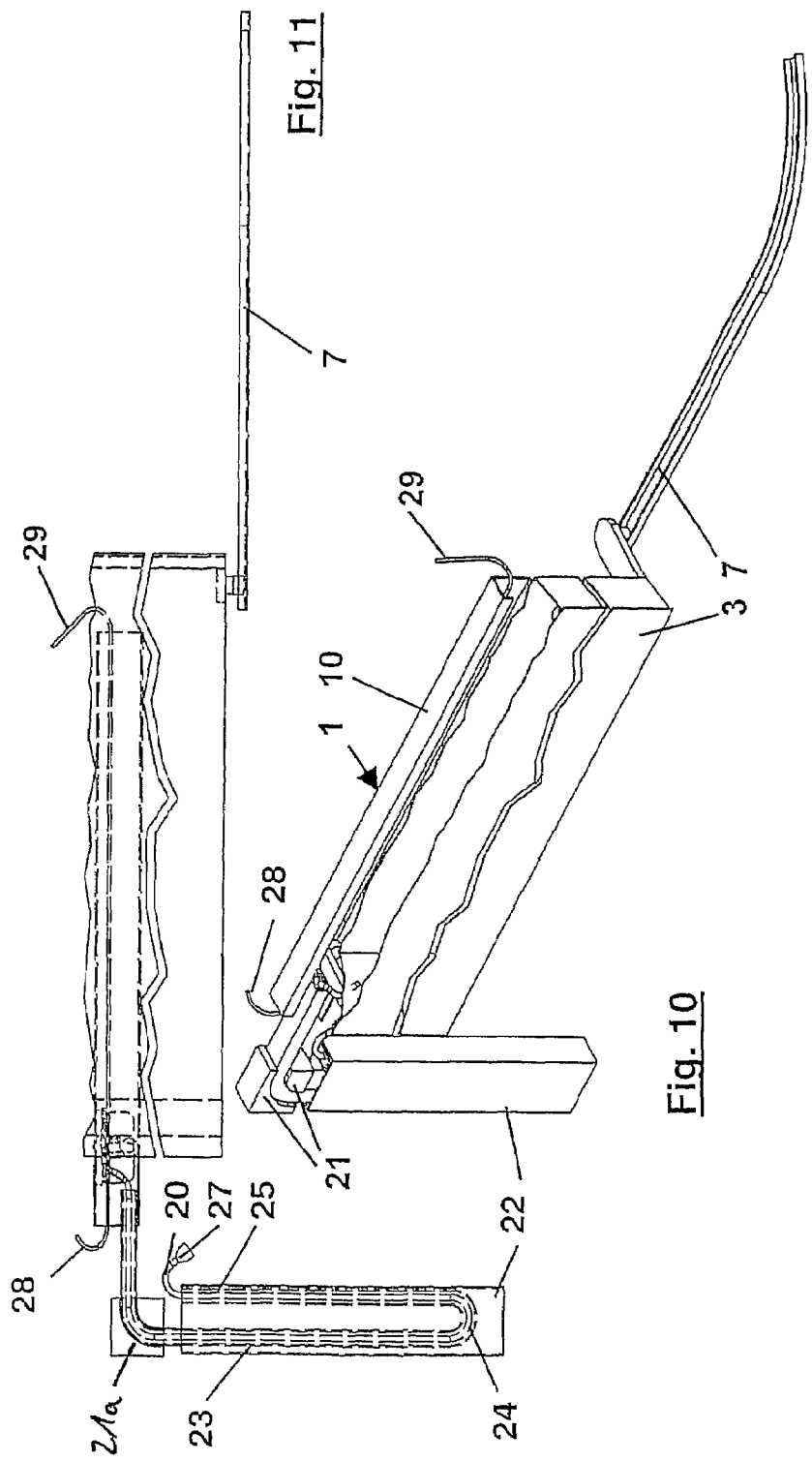

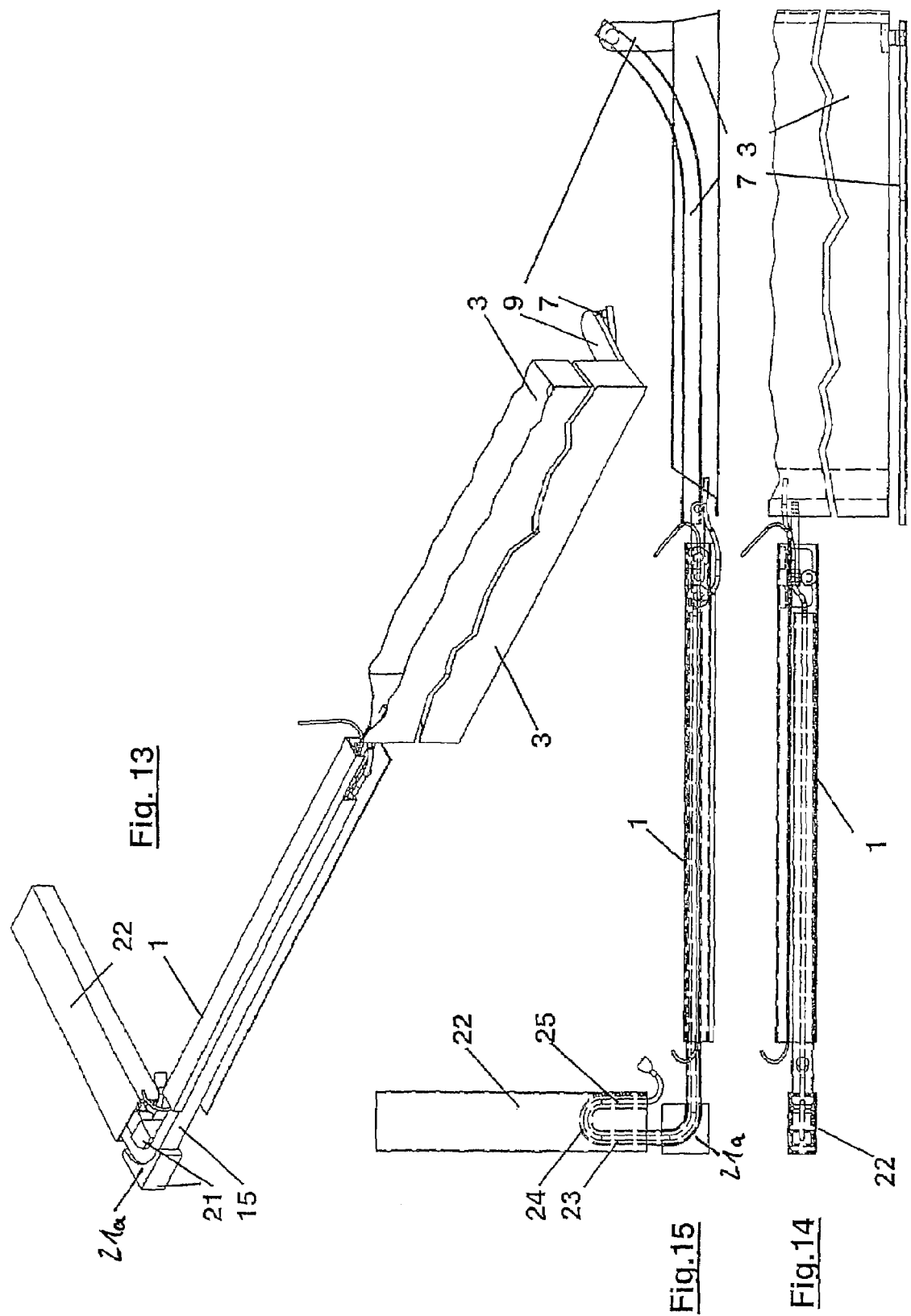

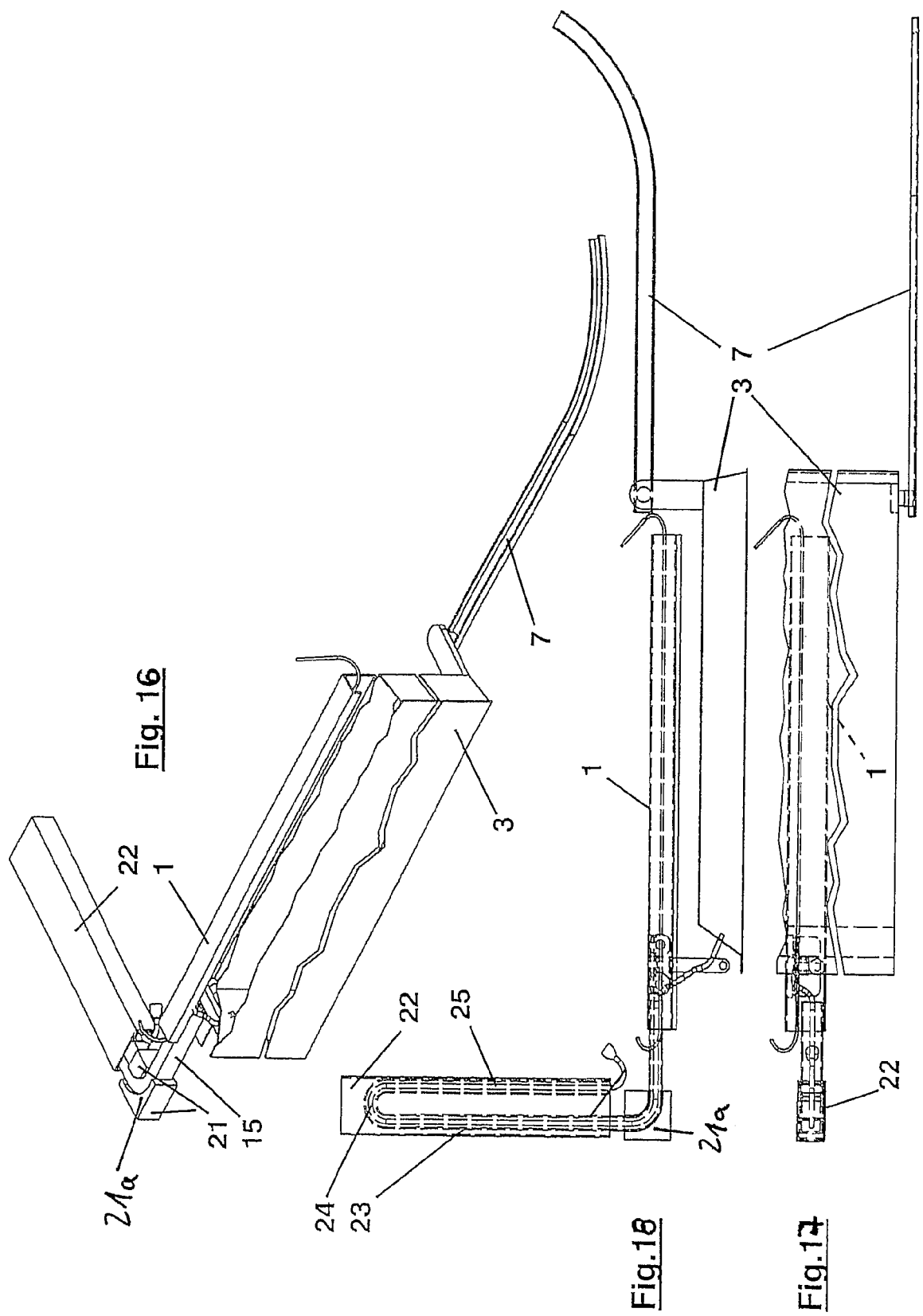

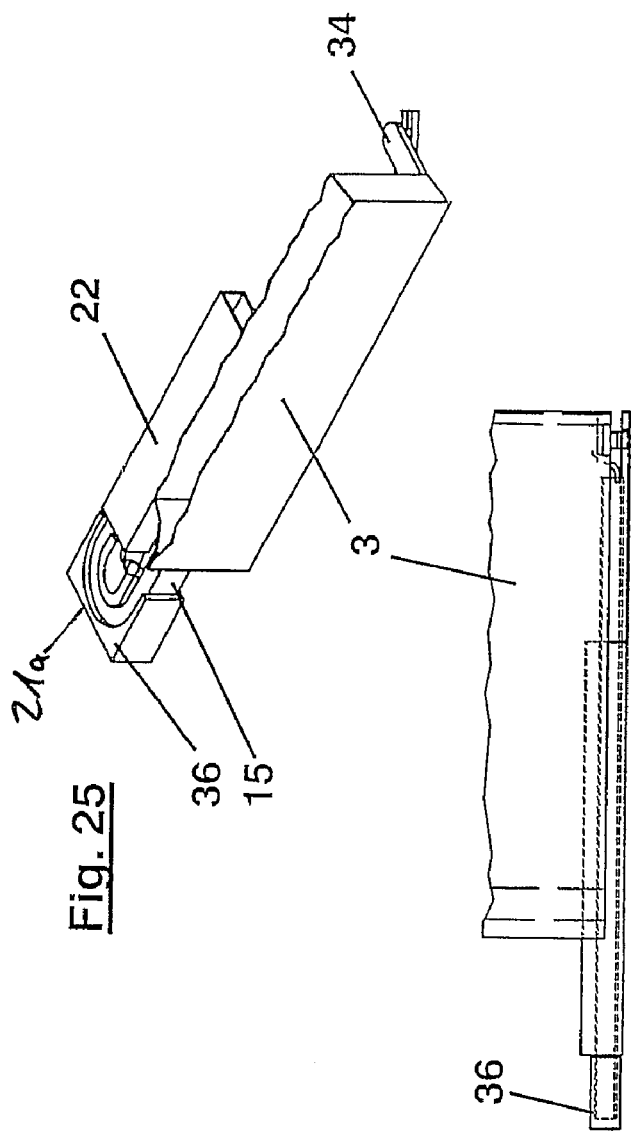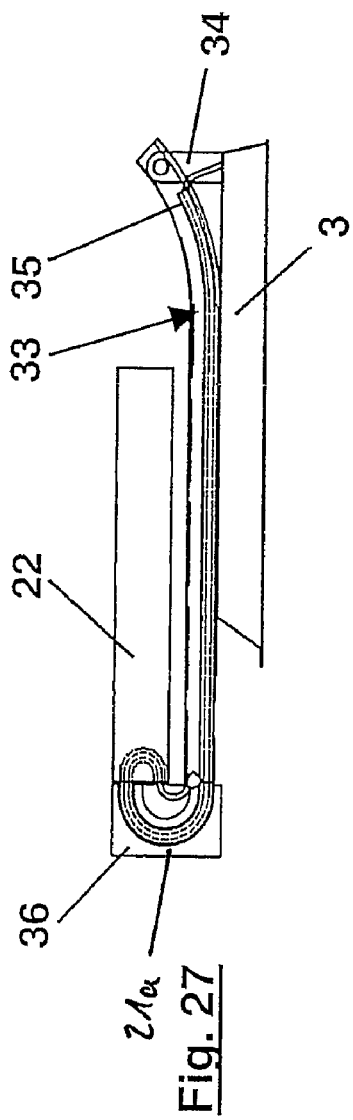
Fig. 25
Fig. 26
Fig. 27

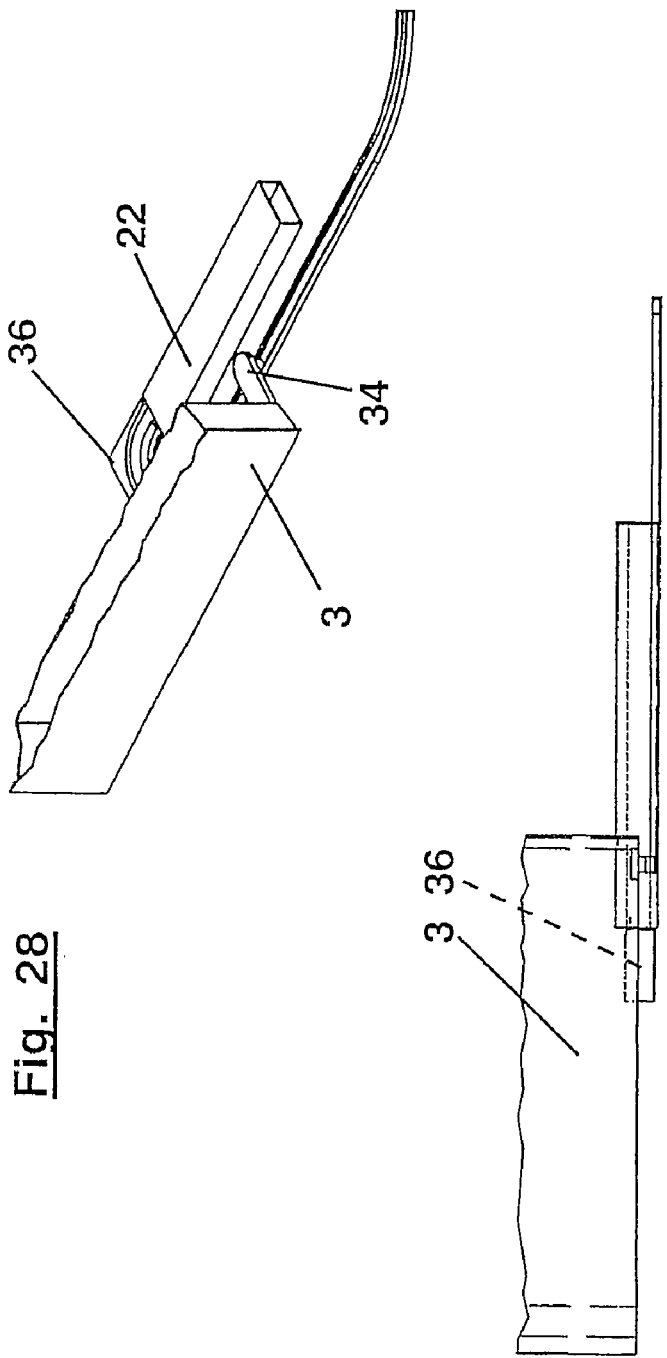

SLIDING DOOR SYSTEM

The invention concerns a sliding door system for a vehicle with a vehicle body having a door opening and a sliding door, comprising a guide rail which can be mounted on or in the vehicle body in the proximity of the door opening, a guide element which is displaceable along the guide rail and which is connected to the sliding door by way of a holding arm, a line receiving means of pivotably interconnected members for receiving and guiding electric lines from a connection on the vehicle body to a connection on the sliding door, wherein the line receiving means is guided in a guide device.

A sliding door system of that kind is known from EP 1 010 558 A2. Here in its front region, that is to say which is directed towards the front of the vehicle, the sliding door has upper and lower holding arms, on each of which a respective guide roller is mounted as a guide element. The guide rollers are displaceable in a guide rail on the vehicle body above the door opening and below the door opening respectively. In order to move the sliding door out of the door opening when it is opened and to move it into the door opening when it is closed, the guide rails are curved towards the interior of the vehicle at their forwardly facing ends.

As can also be seen from the above-identified publication, arranged in parallel relationship with the lower guide rail for the roller mounted on the lower holding arm, at the side towards the door opening, is a channel with a line receiving means guided therein. The line receiving means is in the form of an energy guide chain comprising pivotably interconnected chain link members and has a lower run which at its end is connected fixedly to the vehicle body, and an upper run which at its end is fixed to the lower holding arm for the sliding door. The upper and lower runs are connected together by a curved region of the energy guide chain.

The energy guide chain known from the above-identified publication serves for receiving and guiding lines from a connection on the vehicle body to a connection on the lower holding arm of the sliding door in order to supply electrical energy to various electric devices arranged in the sliding door such as for example an electric drive motor for the sliding door.

The system including the guide rail with the roller running therein and the guide device with the energy guide chain which is guided therein accordingly takes up a great deal of space in the region of the vehicle body, which adjoins the door opening. In particular there must be sufficient space between the guide rail and the door opening, for the guide device for the energy guide chain. Upon subsequent installation of the unit consisting of the guide device and the line receiving means therefore the available space may be problematical so that modifications are required to the vehicle body in the region in question.

Japanese Abstract 11093514 describes a sliding door system for a vehicle comprising a drive roller driven by an electric motor and a toothed belt circulating between the drive roller and further driven rollers. As the toothed belt is connected by way of a traction arm to a carrier element for a roller, a sliding door is pulled and the vehicle opening is opened or closed. In the opening or closing movement of the door an electric feed cable is unwound from the roller against the spring force of a spiral spring or wound on to the roller. The electric feed cable unwound from the roller is not exposed outwardly as it is arranged in a lower rail.

Japanese Abstract 2002225644 describes a sliding door system for a vehicle having a coupling device which is arranged within a guide having a plurality of intermediate portions arranged between an end portion and a base end portion, which coupling device can be transferred from an elongate, slightly arcuate arrangement into a substantially U-shaped curved arrangement. Fixed to a roller fixing means secured to a sliding door is a deflection means which has a completely opened deflection guide portion and a completely closed deflection guide portion, which is in contact with the end of the guide of the coupling device both at the beginning of the opening movement of the door and at the beginning of the closing movement of the door in order to restrict the deflection of the guide means of the coupling device in the opposite direction.

The object of the present invention is to provide a sliding door system which is of a compact structure and which is suitable for subsequent installation of a line receiving means for energy supply to the sliding door.

According to the invention that object is attained by a sliding door system of the kind set forth in the opening part of this specification.

By virtue of that measure the space required for the guide rail of the sliding door and the guide device for the line receiving means can be considerably reduced as this avoids a separate arrangement of the guide rail and the guide device. There is also no need for special complication and effort in terms of designing the guide device for the line receiving means. A suitable line receiving means for energy supply to the sliding door can be subsequently installed in the existing guide rail for the sliding door.

In accordance with the invention both the guide element for the sliding door and also a run of the line receiving means can move in the guide device which can be in the form of a guide device. The run is preferably connected at its end to the guide element or the holding arm for the sliding door so that the lines can issue there and can be fed by way of the holding arm to the sliding door.

As the line receiving means at its other end has a fixed connection to the vehicle body, it requires an arcuate region which adjoins the first run and which is formed by the pivotably interconnected members of the line receiving means, and goes into a second run which is connected to the first connection. When the movable end of the line receiving means moves in the direction of the first run, that run is reduced in length and the second run is increased in length while in the opposite movement the first run is increased in length and the second run is reduced in length.

In order to save as much space as possible in the guide rail or guide device, it is desirably so designed that only the first run connected to the guide element or holding arm of the sliding door is laid therein while the arcuate region with the adjoining second run extends outside the guide rail and the guide device. In that design configuration the fixed connection of the second run to the vehicle body is arranged outside the guide rail and the guide device. The region of the first run which extends out of the guide rail and the guide device, the arcuate region and the second run of the line receiving means can be guided in a housing connected to the guide rail and the guide device. In addition, the region of the first run which extends out of the guide rail and the guide device can extend linearly in relation to the region of the first run which is guided in the guide device, and the second run can extend parallel in relation to the first run. By virtue of the structure of the vehicle body and for reasons of space however it may be desirable for the region of the first run which issues from the guide rail and the guide device to be deflected through a given angle in a given direction, for example in a pillar of the vehicle body, so that the guide housing for that region of the first run, the arcuate region and the second run can be suitably arranged in a position adjoining the guide device. Deflection of the first run can be effected by a suitable deflection device for the line receiving means.

If the line receiving means comprises members which are connected together pivotably only in one plane, wherein the pivot axes of the members all extend in parallel relationship, then deflection of the first run also takes place in that plane. In particular the deflection, such as for example in a pillar of the vehicle body, can be 90° upwardly or downwardly when the line receiving means is so arranged in the guide rail that the pivot axes of the members are directed horizontally. In the case of such a line receiving means the deflection can also be 180° upwardly or downwardly.

In the case of a line receiving means which is arranged in the guide rail in such a way that the pivot axes of the members are directed vertically, deflection can also be through a suitable angle in a horizontal plane. In the case of a line receiving means, the members of which are connected together pivotably not only in one plane but also have a further degree of pivotal movement which is directed transversely with respect to that plane, deflection can be provided for any direction in space.

In particular the guide rail and the guide device can be arranged externally on or in the vehicle body in the region over which the sliding door is moved when it is opened and closed. The holding arm for the sliding door is then arranged in the rear end region of the sliding door, that is to say the end region which is towards the tail of the vehicle.

On the other hand the guide rail and the guide device can also be arranged on or in the lower or upper region of the vehicle body along the door opening, in which case the holding arm is then arranged at the front end region of the sliding door, that is to say the end region which is directed towards the front of the vehicle.

As the sliding door must be moved out of and into the door opening when it is opened and closed and in that situation the spacing between the location at which the holding arm is fixed to the sliding door and the guide rail changes, the holding arm desirably has two arm portions which are connected together pivotably about a substantially vertical axis. The holding arm can be mounted with a further pivot axis pivotably to the sliding door and/or the guide element.

In order to compensate for the component of motion which is directed perpendicularly to the plane of the door opening when the sliding door is opened and closed, the guide rail, in its front end region which is directed therefore towards the front of the vehicle, can have a substantially horizontally extending curvature.

In a preferred development of the invention the movable end of the line receiving means is connected by way of a connecting element to the guide element or the holding arm.

When the guide rail has a horizontally curved end region the connecting element is adapted to be pivotable with respect to the guide element about a substantially vertical axis.

In order to follow the curved end region of the guide rail, the members of the line receiving means can also be connected together pivotably through a given angle in a horizontal plane, at least in the region in question. For that purpose the line receiving means can be so arranged in the guide rail that the pivot axes of the members extend in a vertical direction. If the pivot axes of the members are in a horizontal plane, additional pivotability of the members in that plane is required.

Pivotal movement of the members of the line receiving means in the horizontal direction can however be prevented by the line receiving means remaining in a straight portion of the guide rail, in any position of its travel path. For that purpose the end in question of the line receiving means can be spaced by a connecting element extending in its longitudinal direction, from the guide element or the holding arm, in such a way that, when they are in the end position of the travel path, the end comes to a halt in the straight part of the guide rail.

In a preferred development of the invention the electric lines which issue from the movable end of the line receiving means are fed by way of the holding arm to the sliding door. For that purpose suitable fixing devices and/or guides protecting the lines can be provided on the holding arm.

In a particularly desirable configuration the guide rail can be channel-shaped with an opening which extends in the longitudinal direction and through which the holding arm extends. In that structure the guide element can have at least one roller which is arranged in the channel-shaped guide rail rotatably about a substantially horizontal axis and which is mounted to the holding arm.

In a desirable configuration of the line receiving means it has an end member which is connected by way of a loop-shaped part to the guide element or a part of the holding arm, which extends into the guide rail. Particularly in the case of a guide rail which is curved in the horizontal plane, the loop-shaped part on the end member and/or on the part of the holding arm which extends into the guide rail is mounted pivotably about a substantially vertical axis.

Preferably at least the region of the line receiving means, which is arranged adjacent to the guide element, or the entire region of the line receiving means, will move as far as the deflection region thereof directly in the track of the guide element. The guide rail for the guide element of the sliding door therefore does not have to be widened or practically not widened.

Provided at an end of the guide rail which is directed towards an end of the vehicle, that is to say towards the front of the vehicle or towards the tail of the vehicle, is a deflection region for the line receiving means, by which it is deflected through a given angle in a given direction when moving towards the end of the vehicle, while connected to the deflection region is a channel-shaped guide in which the deflected portion of the line receiving means extends as a first run, which is adjoined by a substantially semicircular arc of a predetermined radius and same is adjoined by a second run, the end of which is stationarily connected to the vehicle body.

In a particularly compact configuration of the sliding door system according to the invention the guide rail, at its rear end, that is to say the end which is directed towards the tail of the vehicle, has a deflection region for the line receiving means, by which the line receiving means is deflected through a given angle in a given direction, in the movement in the direction of the tail of the vehicle. The deflection region is advantageously adjoined by a channel-shaped guide in which the deflected portion of the line receiving means extends as a first run which is adjoined by a substantially semicircular arc of a predetermined radius and same is adjoined by a second run, the end of which is stationarily connected to the vehicle body.

The deflection region for the line receiving means can thus be provided at the rear end of the guide rail, that is to say the end which is directed towards the tail of the vehicle, by which it is deflected through a given angle in a given direction when moving in the direction of the tail of the vehicle.

The means for deflection of the line receiving means can be in particular the end, directed towards an end of the vehicle, of the guide rail, or a channel-like or housing-like region of the guide device. Deflection can thus be effected 'freely', that is to say without further auxiliary means, in which respect it will be appreciated that a suitable configuration can be provided for the guide region of the guide device. In particular deflection can occur at a stationary part, it is thus possible to completely forego movable parts for the deflection of the line receiving means. Deflection can thus be effected substantially or completely by parts which are in any case required for housing-like encapsulation of or receiving the line receiving means. In this respect the deflection device can be in the form of a separate part of the guide device and possibly spaced from adjacent regions thereof. Deflection can thus occur at the outwardly curved side of the line receiving means. By virtue of the free deflection effect, the entire arrangement is particularly compact, less susceptible to trouble and simple to maintain, and the line receiving means is simple to replace.

Deflection of the first run of the line receiving means at the end of the guide rail, which is directed towards an end of the vehicle, can take place for example through about 90° or through about between 120° and about 180°, in particular about 180°.

The curvature of the deflection of the first run of the line receiving means at the end of the guide rail, which is directed towards the end of the vehicle, and the substantially semicircular deflection of the line guide device between the first and second runs, with respect to the longitudinal extent of the line guide device, are in the same direction. The second run can thus be arranged in a region which is included between the two portions of the first run, wherein the two portions respectively adjoin the deflection.

The line receiving means which is guided substantially horizontally in adjacent relationship with the sliding door, in the deflection region, can occur in a substantially vertical direction, that is to say 'upwardly' or 'downwardly' with respect to the vehicle, or in a direction in opposite relationship to the direction of movement of the sliding door to be opened.

The channel-shaped guide can be formed in particular as an elongate, substantially parallelepipedic housing, in the end of which there is an opening for the deflected portion of the line receiving means to pass therethrough, and in which the respective outwardly facing sides of the run are guided at two oppositely disposed longitudinal sides.

Desirably the channel-shaped guide is arranged in a pillar of the vehicle body.

The sliding door system according to the invention can have a drive device for moving the sliding door along the guide rail.

In a desirable embodiment the drive device has a reversible motor arranged in the vehicle body and a pulling device which is driven by the motor and which is connected in the longitudinal direction of the guide rail to both sides of the holding arm or is fixed to the holding arm and with which the holding arm is displaceable along the guide rail in both directions in dependence on the direction of rotation of the motor.

The pulling device can have two cable runs which are each connected to a respective side of the holding arm and which extend along the guide rail and are deflected at the ends thereof to a drive unit which, in dependence on the direction of rotation of the motor, exerts a pulling force on one cable run or the other.

On the other hand the pulling device can be formed by a toothed belt drivable by the motor by way of a pinion.

The toothed belt can either be fixed in the form of an endless belt to a location on the holding arm or it can be connected at its ends to the holding arm and guided by deflection rollers.

In another embodiment, the drive device can have a motor arranged in the sliding door, a pinion driven by the motor and arranged on the holding arm, and a row of teeth which mesh with the pinion and which extend along the guide rail.

If the guide rail and the guide device are arranged externally at the vehicle body in the region over which the sliding door is pushed, then, to assist with guiding the sliding door, there is preferably provided at least one second guide rail on the vehicle body in the upper and/or lower region along the door opening, along which rail there is displaceable a second guide element which is connected by way of a second holding arm to the front region of the sliding door, that is to say the region which is directed towards the front of the vehicle.

Figure 20:
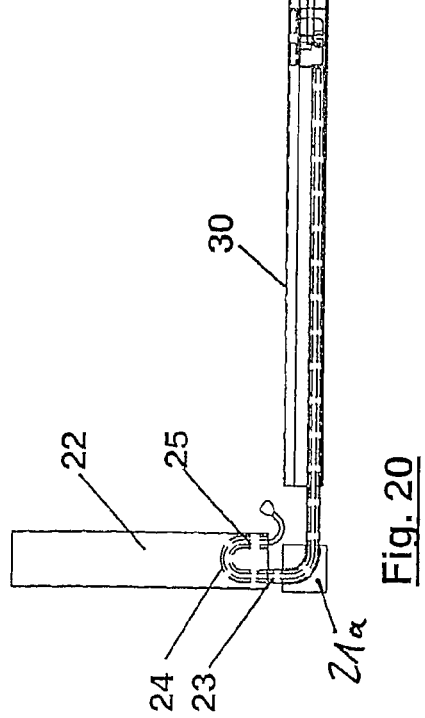
Figure 21:
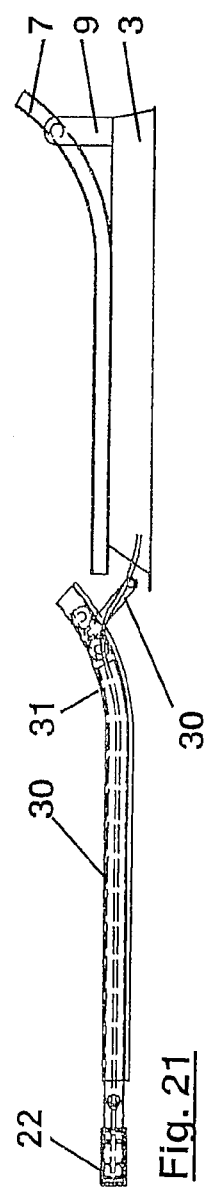
Figures 22, 23, 24:
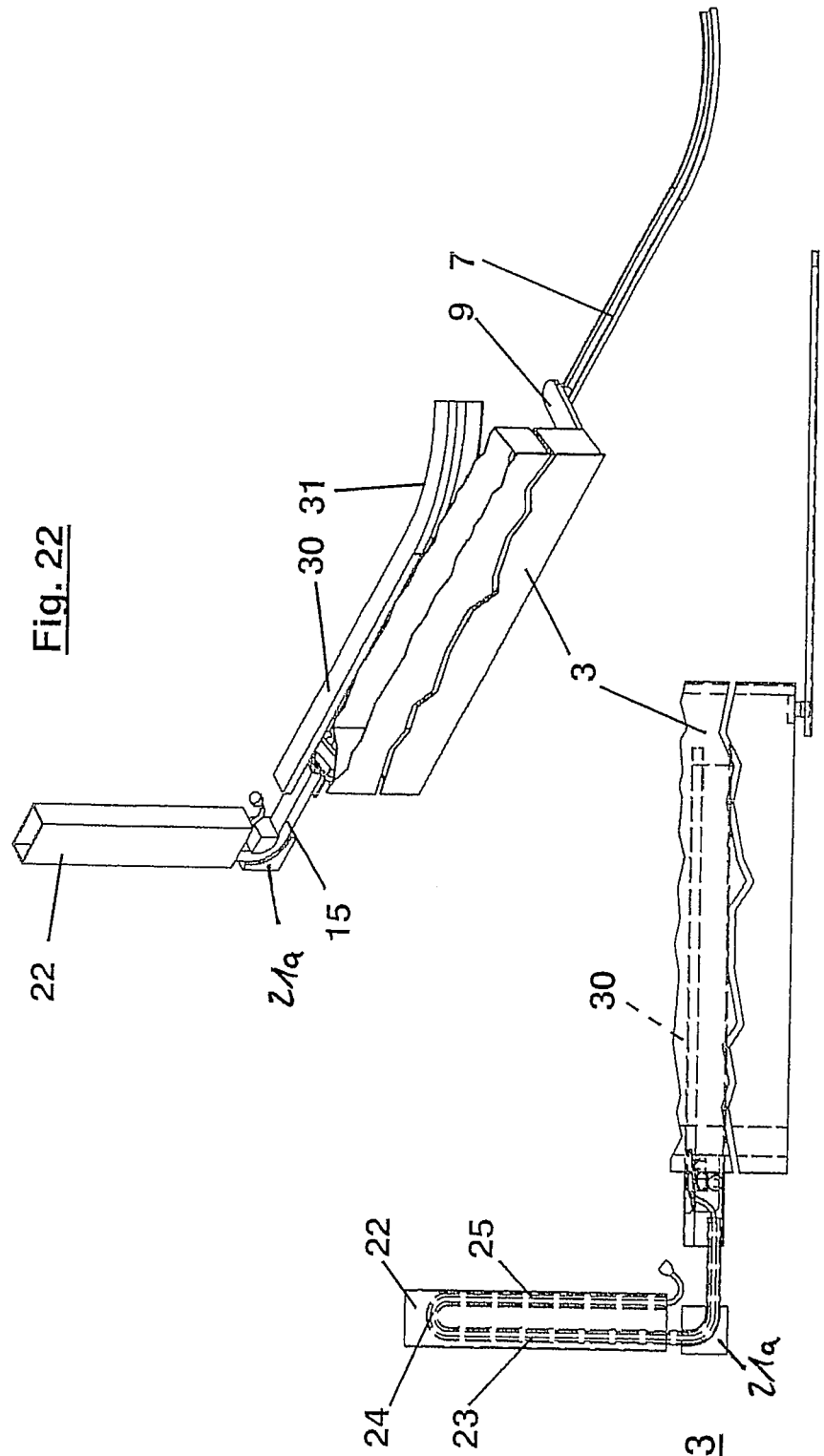

Embodiments by way of example of the present invention are described hereinafter with reference to the drawing in which:

FIG. 1 shows a perspective view of a sliding door system with closed sliding door, FIG. 2 shows a side view of the sliding door system shown in FIG. 1, FIG. 3 shows a plan view of the sliding door system shown in FIG. 1, FIG. 4 shows a perspective view of the sliding door system with the open sliding door, FIG. 5 shows a side view of the sliding door system shown in FIG. 4, FIG. 6 shows a plan view of the sliding door system shown in FIG. 4, FIG. 7 shows a perspective view of a second embodiment of a sliding door system with closed sliding door, FIG. 8 shows a side view of the sliding door system shown in FIG. 7, FIG. 9 shows a plan view of the sliding door system shown in FIG. 7, FIG. 10 shows a perspective view of the sliding door system with open sliding door, FIG. 11 shows a side view of the sliding door system shown in FIG. 10, FIG. 12 shows a plan view of the sliding door system shown in FIG. 10, FIG. 13 shows a perspective view of a further embodiment of a sliding door system with closed sliding door, FIG. 14 shows a side view of the sliding door system shown in FIG. 13, FIG. 15 shows a plan view of the sliding door system shown in FIG. 13, FIG. 16 shows a perspective view of the sliding door system with open sliding door, FIG. 17 shows a side view of the sliding door system shown in FIG. 16, FIG. 18 shows a plan view of the sliding door system shown in FIG. 16, FIG. 19 shows a perspective view of a further embodiment of a sliding door system with closed sliding door, FIG. 20 shows a side view of the sliding door system shown in FIG. 19, FIG. 21 shows a plan view of the sliding door system shown in FIG. 19, FIG. 22 shows a perspective view of the sliding door system with open sliding door, FIG. 23 shows a side view of the sliding door system shown in FIG. 22, FIG. 24 shows a plan view of the sliding door system shown in FIG. 22, FIG. 25 shows a perspective view of a further embodiment of a sliding door system with closed sliding door, FIG. 26 shows a side view of the sliding door system shown in FIG. 25, FIG. 27 shows a plan view of the sliding door system shown in FIG. 25, FIG. 28 shows a perspective view of the sliding door system with open sliding door, FIG. 29 shows a side view of the sliding door system shown in FIG. 28, and FIG. 30 shows a plan view of the sliding door system shown in FIG. 28.

As can be seen from FIGS. 1 through 6 the sliding door system illustrated therein includes a first guide rail 1 in which a first guide element 2 is arranged displaceably in the longitudinal direction of the guide rail 1. The guide rail 1 is arranged in the outside of a vehicle body (not shown in the drawing) in the proximity of a door opening which is closable by a sliding door 3. As can be seen in particular from FIGS. 4 through 6 the guide rail 1 is arranged in the region of the vehicle body in the proximity of the door opening, over which the sliding door 3 is pushed when it is opened and closed.

A holding arm 5 is mounted to the sliding door 3 by way of a pivot 4 with a vertical pivot axis. At its other end the holding arm 5 is pivotably connected by way of a pivot 6 with an also vertical pivot axis, to the guide element 2.

As shown in FIGS. 1 through 3 the holding arm 5, when the sliding door 3 is in the closed condition, extends substantially in the longitudinal direction of the first guide rail 1 towards the sliding door 3. When the sliding door 3 is opened it is guided outwardly out of the door opening along a curved path of movement, in which case the holding arm 5 is pivoted outwardly, as shown in FIGS. 4 through 6.

To assist with guidance for the sliding door 3, there is provided a second guide rail 7 in the vehicle body in the lower region along the door opening, as shown in the right-hand region in FIGS. 1 through 6. The front region of the second guide rail 7, that is to say the region which is directed towards the front of the vehicle, is curved towards the interior of the vehicle in order to guide the sliding door out of the door opening when it is opened and to guide it into the door opening when it is closed. A second guide element 8 is arranged in the second guide rail 7 displaceably along the guide rail 7. The second guide element 8 is connected by way of a holding arm 9 to the front region of the sliding door 3, that is to say the region which is directed towards the front of the vehicle. The second guide rail 7 is of a groove-shaped configuration and is open upwardly. The second guide element 8 has a roller which is displaceable in the groove-shaped guide rail 7.

A third guide rail which is of a corresponding configuration to the second guide rail 7 is provided in the upper region of the vehicle body above the door opening (not shown in the drawing). The third guide rail assists with guidance of the sliding door 3 by way of a holding arm (corresponding to the second holding arm 9) which is mounted in the upper front region of the sliding door and on which a third guide element (corresponding to the second guide element 8) in the form of a roller is arranged, being displaceable in the third guide rail.

The first guide rail 1 is of a channel-shaped configuration, with an opening which extends in the longitudinal direction and outwardly, through which the first holding arm 5 engages. The top side 10 of the guide rail 1 is of a configuration in the form of an inverted U.

The first guide element 2 is in the form of a carriage which is displaceable with a lower roller 11 on the bottom 12 of the channel-shaped guide rail 1. The carriage also has two lateral guide rollers 13, 14 which are spaced at a spacing in the longitudinal direction of the guide rail 1 and which extend along the inside walls of the lateral limbs of the U-shaped top side 10. The first guide element 2 which is in the form of a carriage is thus displaceable in the guide rail 1 without the risk of tilting by virtue of the forces which are exerted laterally by the holding arm 5 when the sliding door 3 is opened and closed.

As can further be seen from FIGS. 1 through 6, a line receiving means 15 is arranged in the first guide rail 1, displaceably along the guide rail 1. The line receiving means 15 comprises members 16 which are connected together pivotably about horizontal pivot axes. The members 16 have side portions (not shown in detail in the drawing) and upper and lower transverse limbs connecting same, and are pivotable relative to each other by pivot connections at the oppositely disposed end regions of their side portions. The pivotal connection of the members 16 can also be afforded by other known means, such as for example flexurally elastic connections between the members.

The line receiving means which is thus in the form of a chain serves to receive and guide electric lines from a connection on the vehicle body to a connection in the sliding door 3, wherein the lines provide electrical energy to electric devices provided in the sliding door 3.

At one end, the line receiving means 15 which is in the form of an energy guide chain is provided with an end member 17 connected by way of a connecting element to the first guide element 2 which is in the form of the carriage. When the guide element 2 is displaced, the line receiving means 15 is reciprocated along the guide rail 1. In that situation, the part of the line receiving means 15, which is displaced in the guide rail 1, slides on the bottom 12 of the channel-shaped guide rail 1 and is guided laterally by its side wall 19 which faces towards the interior of the vehicle.

The lines 20 which issue from the end member 17 of the line receiving means 15 are passed by way of the holding arm 5 to a connection in the sliding door 3.

In FIGS. 1 through 6 but also the other embodiments, the region 15a of the line receiving means 15, which is arranged adjacent to the guide element, and here even the region thereof which extends as far as the deflection region 21, will move directly in the track of the guide element.

It can further be seen from FIGS. 1 through 6 that the line receiving means 15 issues at the end of the first guide rail 1, which is remote from the sliding door 3, and is guided upwardly by a deflection device 21 into a further guide housing 22. The region of the line receiving means 15, which extends by way of the deflection device 21 into the guide housing 22, forms a first run 23 which is adjoined by a substantially semicircular arc 24 which in turn is adjoined by a second run 25. At the free end of the second run 25 the line receiving means 15 is fixed to the guide housing 22 by an end member 26 and is thus arranged stationarily with respect to the vehicle body.

As in particular a comparison of FIGS. 2 and 5 shows, the guide housing 22 serves as a reservoir into which the line receiving means 15 can extend to a greater or lesser extent when the guide element 2 which is connected to the sliding door 3 and which is in the form of the carriage is displaced, with the adjoining part of the line receiving means 15, in the first guide rail 1.

The guide housing 22 is arranged in a compact fashion in a pillar of the vehicle body. In that way the line receiving means 15 with the deflection device 21 and the perpendicular guide housing 22 can also be subsequently installed in a vehicle body with a first guide rail 1 for guiding a holding arm 5 connected to the sliding door 3.

As will be apparent from the drawing the electric lines 20 which issue from the end member 26 are connected by a plug 27 to a connection on the vehicle body.

A drive device (not shown in the drawing) is provided for moving the sliding door 3 along the guide rails 1 and 7. The drive device has a reversible motor arranged in the vehicle body and a pulling device which is driven by the motor and which is connected in the longitudinal direction of the guide rail 1 to the guide element 2 in the form of the carriage, and with which the guide element 2 is displaceable along the guide rail 1 in both directions in dependence on the direction of rotation of the motor. The pulling device has two cable runs 28 and 29 which are each connected to a respective side of the guide element 2 and which extend along the guide rail 1 and which are deflected at the ends thereof by deflection rollers (not shown) to a drive unit which, in dependence on the direction of rotation of the motor, applies a pulling force to one cable run 28, 29 or the other.

At an end of the guide device (or also the guide rail), which is directed towards an end of the vehicle, towards the left and towards the tail of the vehicle in the Figures, there is provided a deflection region for the line receiving means 15, by which the line receiving means is deflected through a given angle into a given direction upon displacement in a direction towards the end of the vehicle, while connected to the deflection region is a channel-shaped guide in which the deflected portion of the line receiving means 15 extends in the form of a first run 23 which is adjoined by a substantially semicircular arc 24 of a predetermined radius while adjoining same is a second run 25, the end of which is stationarily connected to the vehicle body.

The deflection region for the line receiving means 15 is here provided at the rear end of the guide rail, which is towards the tail of the vehicle.

The means for deflection of the line receiving means 15 is the end of the passage-like or housing-like guide device, which end is directed towards an end of the vehicle and is provided by the deflection device 21. The end of the guide rail can be of a corresponding configuration. In that respect the passage-like or housing-like region of the guide device is arranged as a prolongation of the guide rail, and that can also apply to all other embodiments.

Deflection of the first run of the line receiving means 15 at the end of the guide rail, which is directed towards an end of the vehicle, is effected in this case through about 90° (FIG. 1), but it can also be through about 180° (FIG. 27). The curvature of the deflection of the first run at the end of the guide rail which is directed towards an end of the vehicle and the substantially semicircular deflection of the line guide device 15 between the first and second run are in this case in the same direction with respect to the longitudinal extent of the line guide device 15.

FIGS. 7 through 12 show a further embodiment of a sliding door system in which, as a modification from the embodiment shown in FIGS. 1 through 6, the line guide device 15 which issues from the guide rail 1 at the side remote from the sliding door 3 is diverted downwardly through 90°. Therefore the guide housing serving as a reservoir for the line receiving means 15 extends downwardly from the deflection device 21 and can also be arranged in a space-saving fashion in a pillar of the vehicle body. The member at the free end of the second run 25 of the line receiving means is fixed to the guide housing 22 as in the first embodiment and is therefore arranged stationarily with respect to the vehicle body. The electric lines 20 extending out of the end member can be connected by a plug 27 to a connection on the vehicle body.

In other respects the sliding door system shown in FIGS. 7 through 12 corresponds to the sliding door system shown in FIGS. 1 through 6 so that reference is made to the foregoing description relating to FIGS. 1 through 6.

The embodiment shown in FIGS. 13 through 18 of a sliding door system differs from the above-described embodiments in that the line receiving means 15 in the form of an energy guide chain is arranged lying in the guide rail 1 on the side, that is to say the pivot axes of the members 16 face in a vertical direction.

In accordance with that arrangement of the line receiving means 15, as can be seen from FIGS. 13 through 18, the region of the line receiving means 15 which issues from the guide rail 1 at the end remote from the sliding door 3 is deflected in a horizontal plane, into the interior of the vehicle. The deflection device 21 and the guide housing serving as a reservoir for the line receiving means 15 are therefore arranged horizontally and can be installed at a suitable location on the vehicle body.

In other respects the embodiment shown in FIGS. 13 through 18 does not differ from the above-discussed embodiments.

The embodiment shown in FIGS. 19 through 24 substantially corresponds to the embodiment shown in FIGS. 1 through 6, with the difference that the first guide rail 30, at its end facing towards the closed sliding door 3, has a region 31 which is curved in a horizontal plane, towards the interior of the vehicle. The curved region 31 permits the sliding door 3 to be guided into the door opening by way of a holding arm 32 rigidly arranged on the guide element 2, when the sliding door 3 is closed, and out of the door opening when the sliding door 3 is opened.

As can be seen from the arrangement of the deflection device 21 and the guide housing 22 serving as a reservoir for the line receiving means 15, the pivot axes of the members 16 of the line receiving means 15 face in a horizontal direction so that deflection of the line receiving means 15 into the guide housing 22 can take place vertically. In order to be able to follow the curvature of the curved region 31 of the guide rail 30 the line receiving means 15 must also be pivotable in a horizontal plane through an angle determined by the curvature, at least in its end region which is towards the guide element 2. Pivotability in the horizontal plane containing the pivot axes of the members 16 can be achieved by suitable structural measures in relation to the members 16.

If a curved region 31 of the guide rail, which permits the holding arm 32 to be rigidly mounted to the guide element 2, is desired for a line receiving means 15 which is pivotable exclusively in the plane perpendicular to the pivot axes 16, the line receiving means 15 can be modified as follows.

On the one hand, it can be provided that the line receiving means remains in a straight portion of the guide rail 30 in any position of the travel path. For that purpose, the end in question of the line receiving means 15 can be spaced by a connecting element extending in its longitudinal direction, from the guide element 2, in such a way that, when it is in the end position of the travel path, the end comes to a halt in the straight part of the guide rail 30.

On the other hand the line receiving means 15 can be arranged lying on the side in the guide rail 30 so that the pivot axes of the members 16 extend in a vertical direction. The line receiving means 15 must then be deflected at the end of the guide rail 30 remote from the closed sliding door 3, in a horizontal direction, opposite to FIGS. 19 through 24. The deflection device 21 and the guide housing 22 serving as a reservoir for the line receiving means 15 are then to be arranged as shown in FIGS. 13 through 18.

In the embodiment shown in FIGS. 25 through 30, the guide rail 33 for the guide element 2 of the sliding door 3 is arranged in the lower region of the vehicle body along the door opening and the holding arm 34 is arranged at the front end region of the sliding door 3, which is directed towards the front of the vehicle.

At its front end, the guide rail 33 has a curved region 35 which is directed towards the interior of the vehicle. In that way, when a holding arm 34 is mounted rigidly to the guide element 2, the sliding door 3 can be moved into the door opening when it is closed and out of the door opening when it is opened.

So that the line receiving means 15 can extend into the curved region 35 of the guide rail 33 when the sliding door 3 is closed, it is arranged lying on the side in the guide rail 33, as can be seen in particular from FIGS. 27 and 30, so that the pivot axes of the members 16 are oriented vertically. In a corresponding fashion, deflection of the line receiving means 15 at the end of the guide rail 33 which is remote from the curved region 35 occurs in a horizontal plane, into the guide housing 22. As shown in FIGS. 27 and 30, in this embodiment the deflection is through 180° through a corresponding deflection device 36 so that the guide housing 22 serving as a reservoir for the line receiving means 15 is arranged parallel to the guide rail 33.

LIST OF REFERENCES 1 first guide rail
2 first guide element
3 sliding door
4 pivot
5 holding arm
6 pivot
7 second guide rail
8 second guide element
9 holding arm
10 top side
11 lower roller
12 bottom
13 guide roller
14 guide roller
15 line receiving means
16 member
17 end member
19 side wall
20 line
21 deflection device
22 guide housing
23 first run
24 arc
25 second run
26 end member
27 plug
28 cable run
29 cable run
30 first guide rail
31 curved region
32 holding arm
33 guide rail
34 holding arm
35 curved region
36 deflection device

What is claimed is:

1. A sliding door system for a vehicle having a front and tail end, said vehicle including a vehicle body having a door opening and a sliding door, comprising:
    a guide rail which can be mounted on or in the vehicle body in the proximity of the door opening,
    a guide element which is displaceable along the guide rail and which is connected to the sliding door by way of a holding arm,
    a line receiving means of pivotably interconnected members for receiving and guiding electric lines from a connection on the vehicle body to a connection at the sliding door, wherein the line receiving means is guided in said guide rail,
    characterised in that the line receiving means is arranged in the guide rail and is directed towards the front or the tail end of the vehicle, and includes a deflection region by which the line receiving means is deflected through a given angle in a given direction upon displacement of said line receiving means in a direction towards said front or said tail end of the vehicle, and
    connected to the deflection region is a channel-shaped guide in which the deflected portion of the line receiving means extends as a first and forms a substantially semicircular arc of a predetermined radius with a second run, the end of which is connected stationarily to the vehicle body,
    wherein displacement of the line receiving means through the curvature of the deflection at the end of the guide rail and through the substantially semicircular deflection between the first and second runs.

2. A sliding door system as set forth in claim 1 characterised in that the guide rail is arranged externally on the vehicle body in the region over which the sliding door is moved when being opened and closed, and the holding arm is arranged in a rear end region of the sliding door, wherein said rear end region of said sliding door is directed towards the tail of the vehicle.

3. A sliding door system as set forth in claim 1 characterised in that the guide rail is arranged on or in the lower region of the vehicle body along the door opening and the holding arm is arranged at a front end region of the sliding door, said front end region directed towards the front of the vehicle.

4. A sliding door system as set forth in claim 1 characterised in that the guide rail is arranged on or in the upper region of the vehicle body along the door opening and the holding arm is arranged at a front end region of the sliding door the front end region directed towards the front of the vehicle.

5. A sliding door system as set forth in claim 1 characterised in that in its front end region which is directed towards the front of the vehicle the guide rail has a substantially horizontally extending curved region.

6. A sliding door system as set forth in claim 1 characterised in that the electric lines issuing from an end of the line receiving means are passed by way of the holding arm to the sliding door.

7. A sliding door system as set forth in claim 1 characterised in that the guide rail is of a channel-shaped configuration with an opening which extends in the longitudinal direction and through which the holding arm extends, and the guide element has at least one roller which is arranged in the channel-shaped guide rail rotatably about a substantially horizontal axis and is mounted to the holding arm.

8. A sliding door system as set forth in claim 1 characterised in that the deflection region for the line receiving means is provided at the rear end, which is directed towards the tail of the vehicle, of the guide rail, by which it is deflected through a given angle in a given direction upon displacement in a direction towards the tail of the vehicle.

9. A sliding door system as set forth in claim 1 characterised in that the means for deflection of the line receiving means is the end of the guide rail, which is directed towards an end of the vehicle.

10. A sliding door system as set forth in claim 1 characterised in that the deflection of the first run of the line receiving means at the end of the guide rail is effected at an angle with the guide rail of about 90° to about 180°.

11. A sliding door system as set forth in claim 1 characterised in that the line receiving means which is guided substantially horizontally in adjacent relationship with the sliding door is effected in the deflection region into a substantially vertical direction.

12. A sliding door system as set forth in claim 1 characterised in that the channel-shaped guide is in the form of an elongate substantially parallelepipedic guide housing, in the one end of which there is provided an opening for the passage therethrough of the deflected portion of the line receiving means and in which the respective outwardly facing sides of the runs are guided at two oppositely disposed longitudinal sides.

13. A sliding door system as set forth in claim 1 characterised in that the channel-shaped guide is arranged in a pillar of the vehicle body.

14. A sliding door system as set forth in claim 1 characterised in that, to guide the sliding door, at least one second guide rail is arranged on the vehicle body in the upper and/or lower region along the door opening, with a second guide element which is displaceable along the second guide rail and which is connected by way of a second holding arm to the front region of the sliding door, which is directed towards the front of the vehicle.

* * * * *

UNITED STATES PATENT AND TRADEMARK OFFICE
CERTIFICATE OF CORRECTION

PATENT NO.          : 7,552,962 B2
APPLICATION NO.  : 10/599060
DATED                  : June 30, 2009
INVENTOR(S)         : Richard Habering et al.

It is certified that error appears in the above-identified patent and that said Letters Patent is hereby corrected as shown below:

In column 12, line 18, in Claim 1, delete "first and" and insert -- first run and --, therefor.

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,552,962 B2  Page 1 of 1
APPLICATION NO. : 10/599060
DATED : June 30, 2009
INVENTOR(S) : Richard Habering et al.

It is certified that error appears in the above-identified patent and that said Letters Patent is hereby corrected as shown below:

In column 12, line 25, in Claim 1, after "second runs" insert -- is in the same clockwise or counterclockwise direction --, therefor.

Signed and Sealed this

Second Day of February, 2010

David J. Kappos
*Director of the United States Patent and Trademark Office*